United States Patent
Simonian et al.

(10) Patent No.: US 10,091,860 B2
(45) Date of Patent: Oct. 2, 2018

(54) SWITCH DISCRIMINATING TOUCHLESS LIGHTSWITCH

(71) Applicant: Google Inc., Mountain View, CA (US)

(72) Inventors: Michael Simonian, San Francisco, CA (US); Joe Freeman Britt, Jr., Los Altos, CA (US); Erich Schlaepfer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 564 days.

(21) Appl. No.: 14/091,364

(22) Filed: Nov. 27, 2013

(65) Prior Publication Data

US 2015/0145420 A1 May 28, 2015

(51) Int. Cl.
*H05B 37/02* (2006.01)
*G06F 3/01* (2006.01)

(52) U.S. Cl.
CPC ......... *H05B 37/0227* (2013.01); *G06F 3/017* (2013.01)

(58) Field of Classification Search
CPC ..... H05B 39/06; H05B 37/02; H05B 37/0227
USPC ....... 250/221, 222.1, 214 SW; 315/154, 158, 315/291, 297
See application file for complete search history.

(56) References Cited

U.S. PATENT DOCUMENTS

| 7,115,856 | B2 | 10/2006 | Peng et al. | |
|---|---|---|---|---|
| 7,725,547 | B2* | 5/2010 | Albertson | G06F 3/016 |
| | | | | 382/107 |
| 9,412,053 | B1* | 8/2016 | Patrick | G06K 9/78 |
| 2008/0001649 | A1* | 1/2008 | Cencur | H03K 17/955 |
| | | | | 327/517 |
| 2012/0025717 | A1 | 2/2012 | Klusmann et al. | |
| 2014/0005895 | A1* | 1/2014 | Entenmann | G06F 3/017 |
| | | | | 701/49 |
| 2015/0139483 | A1* | 5/2015 | Shen | G10L 15/22 |
| | | | | 382/103 |

FOREIGN PATENT DOCUMENTS

WO 2010079388 7/2013

OTHER PUBLICATIONS

Philips Applied Technologies,"Hand gesture controlled lighting system", Royal Philips Electronics, 2006.

\* cited by examiner

*Primary Examiner* — Georgia Y Epps
*Assistant Examiner* — Don Williams
(74) *Attorney, Agent, or Firm* — Morris & Kamlay LLP

(57) ABSTRACT

Control of one or more switches arrayed in a multi-gang switch box is disclosed. One or more sensors may receive or provide an indication of a gesture near one of the switches. An indication of the switch determined to which a gesture is determined to be directed toward may be displayed. A state change may be performed on the switch according to the gesture.

20 Claims, 4 Drawing Sheets

SWITCH DISCRIMINATING TOUCHLESS LIGHTSWITCH

BACKGROUND

Light switches are typically operated with a toggle switch. In many instances the light switch has two states, on or off, a while dimmer light switch can vary the intensity of the light it controls. Some light switches respond to an audio clap or series of claps. Gesture technology, however, is not widely applied to light switches because usually light switches are arrayed in a bank of switches.

BRIEF SUMMARY

According to an implementation of the disclosed subject matter, a gesture may be detected by at least one sensor connected to a multi-gang switch box. The multi-gang switch box may include two or more switches. A gesture may be determined to be directed toward one of the switches in the multi-gang switch box. An indication may be display on the switch to which the gesture is determined to be directed toward. A state change for the switch may be determined based on gesture and the switch may be adjusted according to the determined state change.

In an implementation, a device is provided that includes a multi-gang switch box, a plurality of switches and at least one sensor. The at least one sensor may be configured to detect a gesture. The device may include a processor that is configured to determine one of the switches to which the gesture is directed toward. It may cause display of an indication of the switch to which the gesture is determined to be directed toward. The processor may be configured to determine a state change for the switch based on the gesture. It may adjust the one of the switch according to the determined state change.

An advantage of the disclosed subject matter is that it may enable gesture based control of a switch (e.g., light switch) which is adjacent to other switches or controls. Gesture based control of a switch is easy and reduces a user's contact with the switch which reduces the likelihood of germ communication. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Gestures used to control lights typically are large gestures and require precise cameras and recognition of gestures that identify an individual switch. The disclosed systems and methods disclosure relate to maintaining gesture control of a light where the gesture is made proximate to the light switch. A sensor such as a camera or proximity sensor may be near or be a component of the light switch and detect small gestures near the switch. The switch and sensors may be contained within a standard light switch electrical box and cover plate. A small gesture may be, for example, a flick of a finger up or down near (e.g., in front of) the desired light switch. Dimming may be accomplished by a twisting motion, for example, to simulate a rotary switch or by moving a finger up or down near the switch. In an implementation, a detection mechanism is provided for multi-switch arrangements where there may be a bank of two or more light switches in close proximity to one another. To disambiguate which light is being controlled, an indicator at or near the switch being controlled may illuminate in response to the presence of a hand or finger near that switch.

Figure 1:
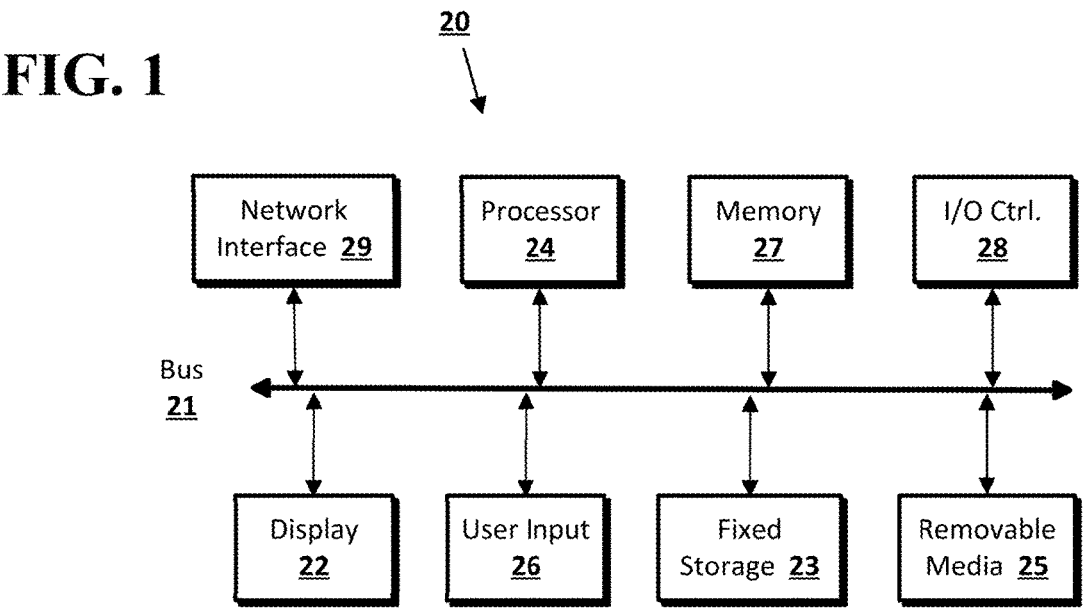
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
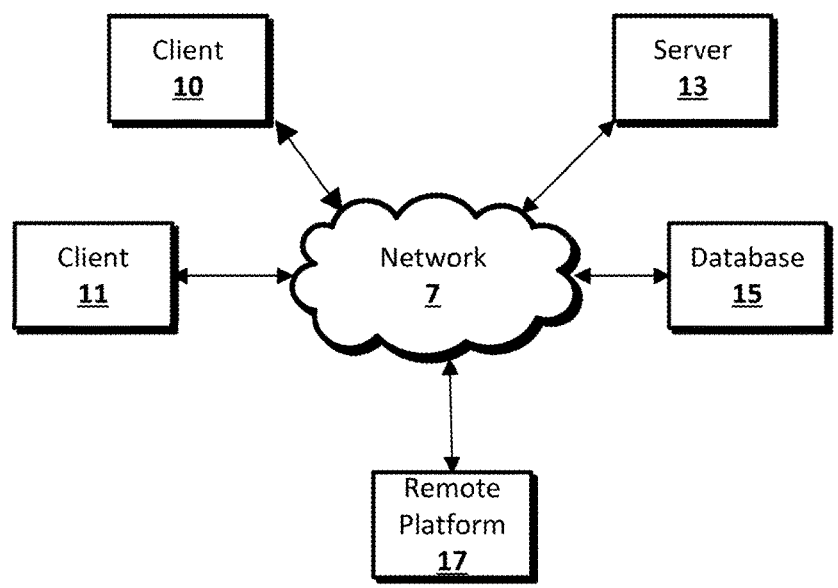
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
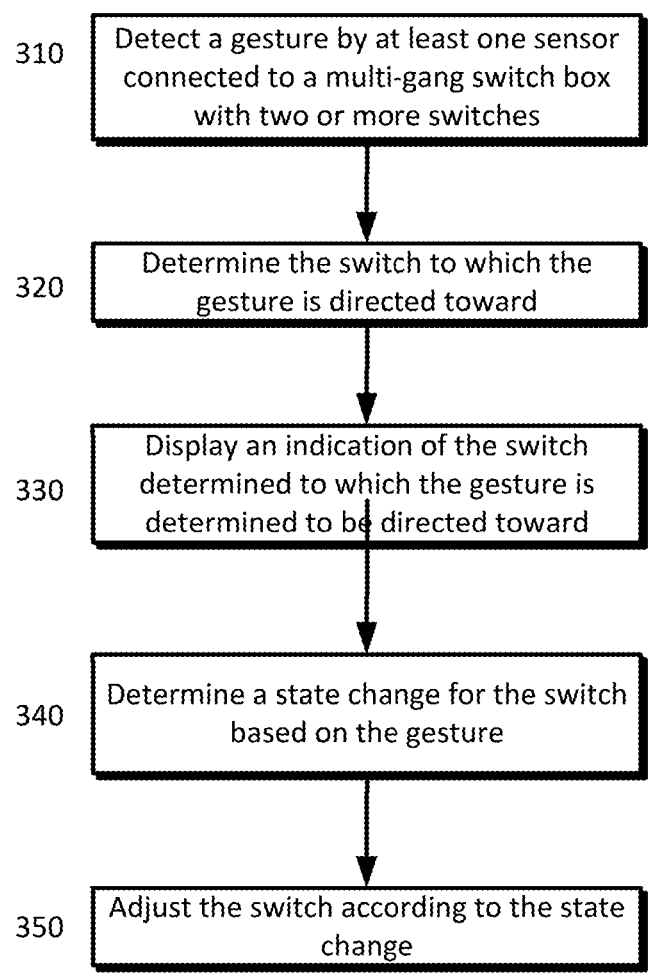
FIG. 3 is an example method for controlling a light switch in a multi-gang switch box as disclosed herein.

In an implementation, an example of which is provided in FIG. 3, at least one sensor connected to a multi-gang switch box may detect a gesture at 310. The multi-gang switch box may include one or more switches. A switch may refer to a conventional binary light switch, dimmer switch, or dial. It may include a vertically positioned strip or line that contains one or more sensors. A sensor may be a camera, proximity sensor, etc. The sensor may activate only when motion is detected within a threshold proximity of the multi gang switch box. For example, a camera may be narrowly focused on an area less than ten centimeters away from the location of the multi-gang switch box. A second camera positioned with a viewing window orthogonal to the first camera may be utilized to narrow the field of vision to a cube-shaped region in front of the multi-gang switch box. In some configurations, each switch may contain a sensor that detects a gesture.

For example, in infrared camera may be utilized to monitor the space immediately in front of the multi-gang switch box. The camera may be connected to a processor, a computer readable medium such as memory or a storage device, and/or a wireless communications protocol such as Wi-Fi, Bluetooth, etc. The camera may be positioned above the switches in the multi-gang box or to the side thereof The processor may be a component of the multi-gang switch box and may be configured to compare input data received by one or more sensors to data stored in computer readable medium that is associated with one or more gestures. For example, a flicking motion may be associated with an "on" or "off" function depending on whether it is made in an upwards or downwards direction. A pattern associated with the on or off gesture may be represented as data stored in storage medium. Other methods of gesture recognition are known by those having ordinary skill in the art and may be compatible with any implementation disclosed herein. A gesture, as used herein, is not limited to a binary (e.g., flicking motion upward or downward) or linear motion (e.g., sliding a finger up or down a light switch). For example, a user may make a "c" shape with her hand and make a motion to rotate a virtual dial.

Hardware components necessary to detect the gesture and/or provide an indication of a switch may be a component of the multi-gang switch box, one or more of the switches, and /or a cover plate for the multi-gang switch box. For example, a camera may be embedded in the multi-gang switch box, a light may be embedded in the cover plate for the multi-gang switch box, and other hardware may be shared between light switches and the multi-gang switch box. In some configurations, a sensor may be embedded in a switch. In some configurations, at least one sensor may be associated with each individual switch in the multi-gang switch box and each switch may contain the hardware components required to perform the gesture detection and the requested action. Each switch may operate independent of other switches in the multi-gang switch box. For example, a user may dim the lights for two lights simultaneously according to implementations disclosed herein.

Returning to the example provided in FIG. 3, a gesture may be determined to be directed toward one or more of the switches at 320. For example, a user may extend an index finger toward a middle light switch. The position of the user's finger relative to other switches may be determined from a camera mounted to provide a view of the area in front of the multi-gang switch box. In another configuration, a sensor mounted in a switch may determine that a gesture is being made in front of it. Thus, in an array of switches where each switch contains a sensor, an individual determination may be made by each switch as to whether or not a gesture has been detected. As a corollary, multiple switches may be controlled simultaneously using a gesture. For example, a user may extend two fingers toward two switches, one finger being directed toward each switch. The user may make an upwards motion with both fingers and cause the lights controlled by the switches to simultaneously turn on or increase brightness.

An indication of the one or more switches to which the gesture is determined to be directed toward may be displayed or played (e.g., a sound) at 330. For example, each switch may have a light emitting diode ("LED") or light above it and the LED may illuminate to indicate to a user that the switch is detecting or receiving the user's input or gesture. A state change for the switch based on the gesture may be determined at 340. A state change may be, for example, an on or off state, a change in brightness, a dimming function, an activate command (e.g., a home alarm system), etc. The one or more switches may be adjusted according to the determined state change at 350. In some configurations, an indication of the state change may be shown on the one or more switches. For example, if the state change is a dimming function, the switch may display a bar that indicates the brightness or intensity level of the light.

As an example, a user may make a gesture that may be associated with a particular state change near a switch. A camera may be positioned near a switch and it may relay images to a computer readable medium that may be evaluated to determine whether or not a gesture has been detected. The switch may illuminate to indicate that the user's gesture is being associated with the particular switch. In this example, the camera's data may be utilized to disambiguate the switch for which the user's gesture is intended. A processor may determine that the gesture is a flicking on motion and turn on the switch.

The state change of a switch may be stored to a computer readable medium or in volatile memory and the stored state change may be retrieved. In some configurations, the gesture may be evaluated in the context of the stored state change. For example, a user may have previously dimmed a light to a particular brightness and then gestured to turn the light off. The brightness setting may be stored and retrieved later such that the next time the user activates the light, it may activate at the previously stored brightness level.

As stated earlier, a LED may be associated with each switch in the multi-gang box. The indication may be deactivated after a predetermined period of time. For example, a time out function may deactivate scanning of the region in front of the switch by one or more sensors after ten seconds. If the indicator is a sound, it may play a different sound after a time out. The predetermined period of time may be configured by a user or set by a manufacturer.

In an implementation, a device is provided that includes a multi-gang switch box 410, two or more switches 420, at least one sensor 430, wherein the at least one sensor is configured to detect a gesture, and a processor 440. The processor 440 may be a component of a switch, the multi-gang switch box cover plate, and/or the multi-gang box. In some instances, the processor may be a component of a separately contained device that fits inside the multi-gang switch box and receive signals from the one or more switches either directly or indirectly. As shown in FIG. 4, the processor 440 is a component of the multi-gang switch box and would be masked by the cover plate on the box 410. The processor may be configured to determine which of the two or more switches the gesture is directed toward. The processor may cause display of an indication on or near the switch to which the gesture is determined to be directed toward to indicate to a user which switch is being controlled or receiving commands. A state change for the switch based on the gesture may be determined as described above and the selected switch may be adjusted according to the determined state change. As described above, one or more sensors near the multi-gang switch box or that are a component thereof may be utilized to receive or provide an indication of the gesture to the processor.

Figure 4A:
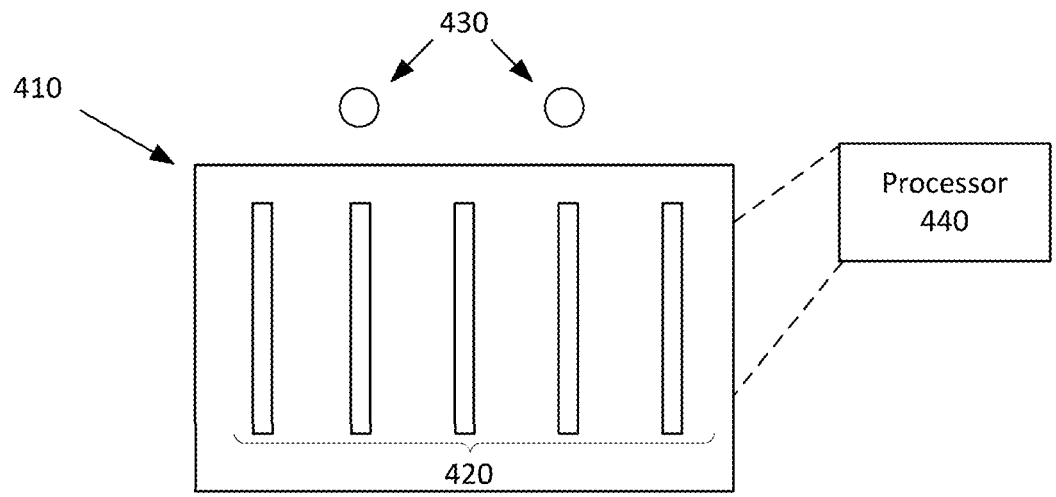
FIG. 4A is an example device for controlling a light switch in a multi-gang switch box as disclosed herein.
Figure 4B:
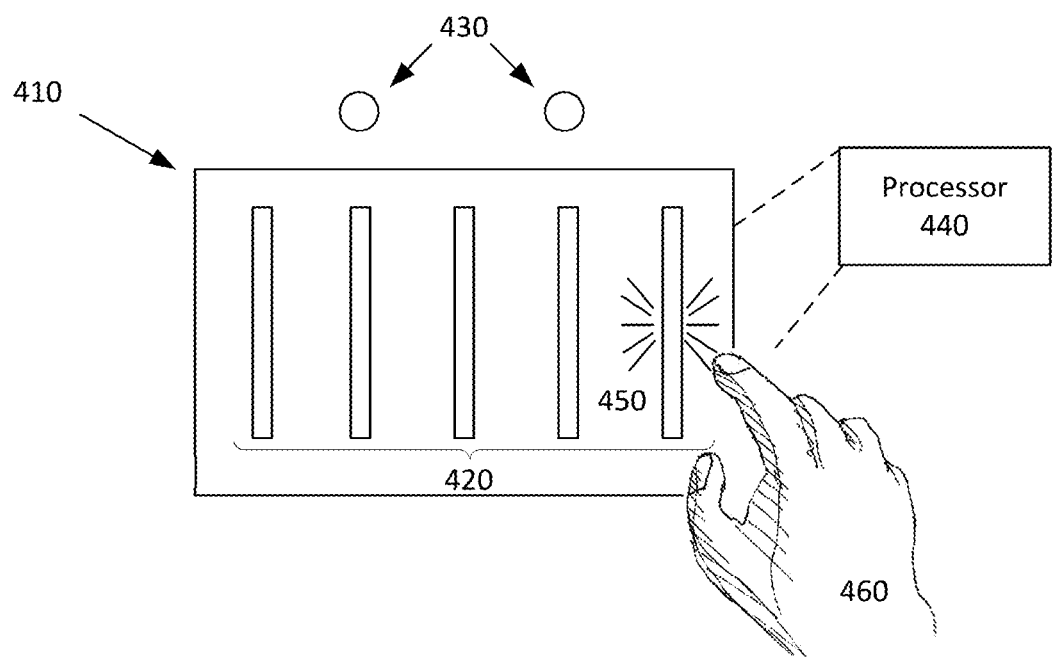
FIG. 4B is an example indication of the light switch that is determined to be controlled by the user's hand.
Figure 4C:
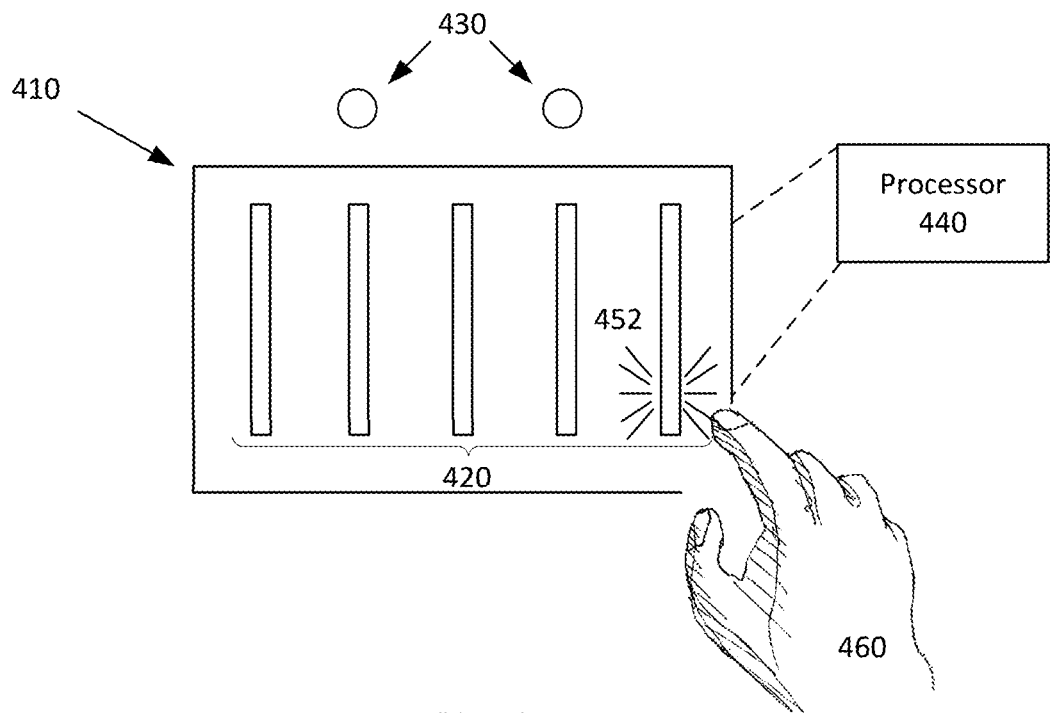
FIGS. 4C and 4D provide examples of how the dimming function may operate for the device according to an implementation disclosed herein.

In FIG. 4B, the last switch 420 may be illuminated 450 because the user's hand or finger 460 is proximal to the last switch. If the user slides the finger 460 to the left, the last switch may cease to illuminate and the switch most proximal to the user's finger 460 may illuminate. In the example provided in FIG. 4A and 4B, two sensors such as cameras 430 observe the space immediately in front of the five switches 420. The processor 440 may receive data from the cameras and determine whether the user's hand 460 is proximal to a switch and, if so, which switch the user's hand 460 is most proximal to. In some configurations, the user may control multiple switches simultaneously and the processor may detect, for example, that the user has extended two fingers toward the switch box 410, each toward a different switch 420. In this case, both switches may illuminate like the illuminated or selected switch 450 shown in FIG. 4B.

Figure 4D:
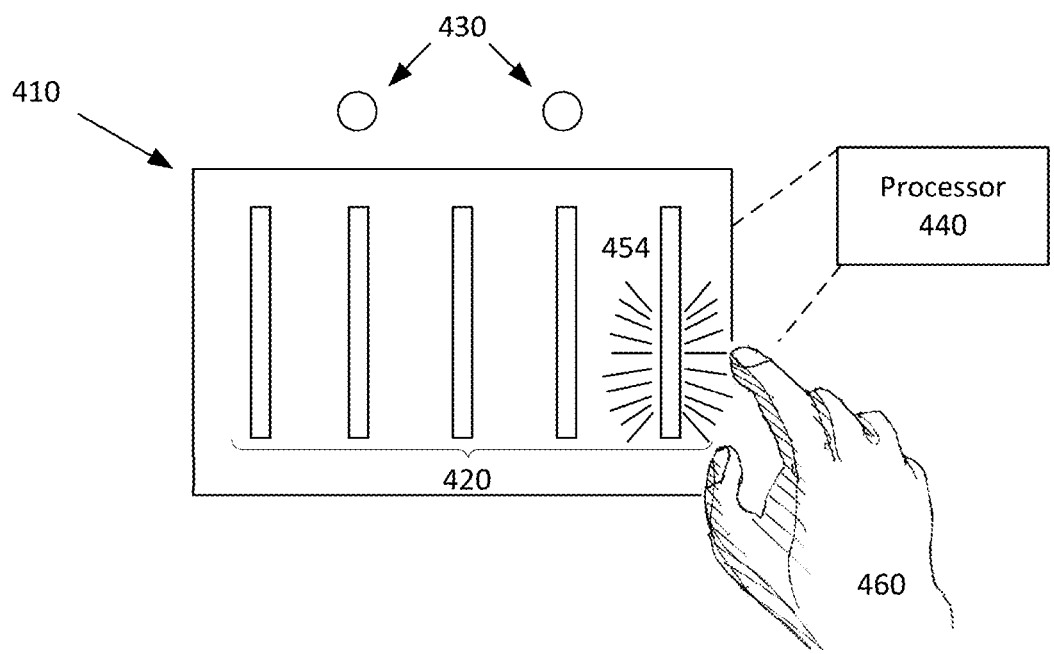

The processor 440 may determine whether and/or which a gesture is being made by the user. For example, in FIG. 4C, the user's hand 460 is detected near the last switch 420 and the switch may illuminate 452 the portion of the switch nearest to the user's finger 460. In this particular example, the switch is represented by a narrow channel and has a dimming function. As the user makes a gesture upward, the switch may illuminate to indicate the user's relative position on the switch 454 as shown in FIG. 4D. The brightness or intensity of a light, for example may increase concurrently with the user's movement upward on the switch 420. Other indicators may be utilized such as a different light colors, a light pattern, a sound pattern or loudness, or vibration intensity or pattern, etc.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
   receiving, by a processor and from at least two sensors, a signal indicative of a gesture, wherein the at least two sensors include a first sensor and a second sensor, the first sensor is directly connected to a multi-gang switch box comprising a plurality of switches, and the second sensor is directly connected to a switch of the plurality of switches;
   determining, by the processor, at least one of the plurality of switches the gesture is directed toward;
   causing, by the processor, an indicator to produce an indication that identifies the at least one of the plurality of switches to which the gesture is directed;
   determining, by the processor, a state change for the at least one of the plurality of switches based on the gesture; and
   causing, by the processor, the at least one of the plurality of switches to be adjusted according to the state change.

2. The method of claim 1, further comprising causing, by the processor, information about the state change of the at least one of the plurality of switches to be stored in a storage medium.

3. The method of claim 1, wherein the receiving the signal indicative of the gesture occurs in response to the gesture being performed within a threshold proximity of the multi-gang switch box.

4. The method of claim 1, wherein the state change is selected from the group consisting of: a change to an on state, a change to an off state, a change in brightness, and a change in a dimming function.

5. The method of claim 1, wherein the indicator comprises a light.

6. The method of claim 1, further comprising causing, by the processor, the indicator to be deactivated after a predetermined period of time of inactivity.

7. The method of claim 1, wherein the first sensor is a component of the multi-gang switch box or a cover plate for the multi-gang switch box.

8. The method of claim 1, wherein at least one sensor of the at least two sensors comprises camera.

9. The method of claim 1, further comprising causing, by the processor, an indication of the state change to be produced on the at least one of the plurality switches.

10. A device, comprising:
    a multi-gang switch box;
    a plurality of switches;
    at least two sensors, wherein the at least two sensors are configured to detect a gesture, the at least two sensors including a first sensor and a second sensor, the first sensor directly connected to the multi-gang switch box comprising the plurality of switches, the second sensor directly connected to a switch of the plurality of switches; and
    a processor, wherein the processor is configured to:
       determine at least one of the plurality of switches to which the gesture is directed toward;
       cause an indicator to produce an indication that identifies the at least one of the plurality of switches to which the gesture is directed;
       determine a state change for the at least one of the plurality of switches based on the gesture; and
       cause the at least one of the plurality of switches to be adjusted according to the state change.

11. The device of claim 10, wherein the at least two sensors are further configured to transmit a signal indicative of the gesture to the processor.

12. The device of claim 10, wherein the processor is further configured to store information about the state change of the at least one of the plurality of switches in a storage medium.

13. The device of claim 10, wherein the at least two sensors are configured to detect the gesture in response to the gesture being performed within a threshold proximity of the multi-gang switch box.

14. The device of claim 10, wherein the state change is selected from the group consisting of: a change to an on state, a change to an off state, a change in brightness, and a change in a dimming function.

15. The device of claim 10, wherein the indicator comprises a light.

16. The device of claim 10, wherein the processor is further configured to cause the indicator to be deactivated after a predetermined period of time of inactivity.

17. The device of claim 10, wherein the first sensor is a component of the multi-gang switch box or a cover plate for the multi-gang switch box.

18. The device of claim 10, wherein the at least two sensors comprise a camera.

19. The device of claim 10, wherein the processor is further configured to cause an indication of the state change to be produced on the at least one of the plurality switches.

20. A device, comprising:
    a processor configured to:
       receive, from at least two sensors, a signal indicative of a gesture, the at least two sensors including a first sensor and a second sensor, the first sensor directly connected to a multi-gang switch box comprising a plurality of switches, the second sensor directly connected to a switch of the plurality of switches,
       identify at least one of the plurality of switches to which the gesture is directed,
       cause an indicator to produce an indication that identifies the at least one of the plurality of switches,
       determine, based on the gesture, a state change for the at least one of the plurality of switches, and
       cause the at least one of the plurality of switches to be adjusted according to the state change; and
    a storage medium configured to store information about the state change.

* * * * *